(12) United States Patent
Ryan

(10) Patent No.: US 6,559,979 B1
(45) Date of Patent: *May 6, 2003

(54) RECORDING APPARATUS AND INFORMATION PROCESSING SYSTEM INCLUDING THE SAME

(75) Inventor: Michael Ryan, Kamakura (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 27 days.

(21) Appl. No.: 08/997,649

(22) Filed: Dec. 23, 1997

(30) Foreign Application Priority Data

Dec. 26, 1996 (JP) .............................. 8-356408

(51) Int. Cl.[7] ................................. H04N 1/00
(52) U.S. Cl. ...................... 358/434; 358/402; 358/404; 358/468
(58) Field of Search .................... 358/434, 440, 358/442, 468, 404, 444, 402, 407; 379/100.01, 100.08, 102.01

(56) References Cited

U.S. PATENT DOCUMENTS

| | | | | |
|---|---|---|---|---|
| 4,996,707 A | * | 2/1991 | O'Malley et al. ............ 379/100 |
| 5,021,892 A | * | 6/1991 | Kita et al. ................... 358/468 |
| 5,048,078 A | * | 9/1991 | Satomi et al. ............... 379/100 |
| 5,481,252 A | * | 1/1996 | Kwon et al. ............ 348/825.22 |
| 5,486,686 A | * | 1/1996 | Zdybel, Jr. et al. ......... 235/375 |
| 5,513,126 A | * | 4/1996 | Harkins et al. .............. 358/407 |
| 5,528,374 A | * | 6/1996 | Matias ........................ 358/296 |
| 5,535,012 A | * | 7/1996 | Matsumoto et al. ......... 358/498 |
| 5,550,649 A | * | 8/1996 | Wong et al. ................. 358/479 |
| 5,684,607 A | * | 11/1997 | Matsumoto ................. 358/442 |
| 5,699,414 A | * | 12/1997 | Telibasa ....................... 379/98 |
| 5,758,081 A | * | 5/1998 | Aytal ..................... 395/200.41 |
| 5,777,882 A | * | 7/1998 | Salgado ................. 364/478.02 |
| 5,802,261 A | * | 9/1998 | Yokoyama ................... 395/115 |
| 5,826,034 A | * | 10/1998 | Albal .......................... 358/407 |
| 5,838,461 A | * | 11/1998 | Hsieh .......................... 358/442 |
| 5,872,901 A | * | 2/1999 | Konno et al. ................ 395/114 |
| 5,936,743 A | * | 8/1999 | Satoh .......................... 358/434 |
| 5,937,148 A | * | 8/1999 | Okazawa ..................... 395/112 |
| 6,115,144 A | * | 9/2000 | Hirokawa .................... 358/468 |
| 6,144,463 A | * | 11/2000 | Utsumi et al. .............. 358/442 |

FOREIGN PATENT DOCUMENTS

JP         07-020976       1/1995
JP         08265468        11/1996

* cited by examiner

*Primary Examiner*—Mark Wallerson
(74) *Attorney, Agent, or Firm*—McDermott, Will & Emery

(57) ABSTRACT

A facsimile machine is usable additionally as a copy machine and image reader based on its image reading function and printing function. The machine has its operating modes set up by the setting operation on any personal computer connected to it through a communication line and the transfer of setup information to the machine operating modes include a facsimile mode in which a source document is read and the document image is sent to the destination a copy mode in which a source document is read and the document image is printed on a recording medium, a scanning mode in which a source document is read and the document image is sent to a specified computer, and an electronic mail mode in which a source document is read and the document image is sent and stored in an electronic mail box assigned to a user through a communication line.

16 Claims, 8 Drawing Sheets

| USER ID NUMBER | FUNCTION AND ASSOCIATED INFORMATION |
|---|---|
| #1 | FAX:xx-xxxxx-xxxxx<br>Copies:xx<br>Send to PC:#x |
| #2 | E-mail:1:xxxx@.xxxx.xxx.xxx.<br>E-mail:2:xxxx@.xxxx.xxx.xxx. |
| #3 | Send to PC:#x |
| #4 | FAX:1:xxx-xxxxx-xxxxx<br>FAX:2:xxx-xxxxx-xxxxx<br>FAX:3:xxx-xxxxx-xxxxx<br>FAX:4:xxx-xxxxx-xxxxx |

RECORDING APPARATUS AND INFORMATION PROCESSING SYSTEM INCLUDING THE SAME

BACKGROUND OF THE INVENTION

1. Field of the Invention

The present invention relates to a recording apparatus, particularly a recording apparatus which is connected to multiple personal computers, by which operating modes which determine functions of the apparatus can be set up, and to an information processing system which includes the recording apparatus.

2. Description of the Prior Art

Recording apparatuses, such as facsimile machines, which are mainly intended for personal use are required to be inexpensive and compact. Therefore, recording apparatus of this kind are simplified in structure and reduced in component parts, and usually do not have functions that are available in large job-oriented recording apparatus but are not used frequently by individual users. These apparatus have simple operation panels, with keys and display areas for functions of infrequent use being eliminated.

On the other hand, however, the drastic elimination of functions that have been available in the conventional recording apparatus will result in a declined usefulness of the apparatus.

For coping with this problem, there has been developed a facsimile machine which is designed to assign numeric keys to telephone numbers for the short dialing function based on the setup operation on the part of a personal computer connected to the machine so that the operation panel and internal arrangement of the machine are simplified while leaving the short dialing function available. The short dialing function mentioned above is to allow the user to assign numeric keys to telephone numbers in advance and dial an intended telephone number by simply pushing the assigned numeric key.

The facsimile machine has for its inherent role a text supply mechanism for putting a source document into the image reader section, a paper feed mechanism for feeding recording paper, an image scanning mechanism for scanning the source document and producing an image signal, and an image printing mechanism for printing the image signal on recording paper. Therefore, it is readily possible for the facsimile machine to be used as a copy machine and image reader by utilization of these functional mechanisms and by the provision of operating mode selection keys on the operation panel or the provision of the numeric keys with the mode selecting function.

However, the above-mentioned facsimile machine has its numeric keys assigned exclusively to telephone numbers for the short dialing function, and has no keys on the operation panel assigned to the mode selection. On this account, if it is intended to utilize these functional mechanisms of facsimile machine for a copy machine or image reader, the number of keys to be laid out on the operation panel will increase against the intention of compact design.

SUMMARY OF THE INVENTION

A prime object of the present invention is to provide a recording apparatus capable of working as a copy machine and image reader based on its image reading function and printing function.

Another object of the present invention is to provide a recording apparatus capable of setting up, by the setting operation on a computer connected to it, the functions and associated information for a copy machine and image reader that the apparatus can work based on its image reading function and printing function.

Still another object of the present invention is to provide an information processing system capable of setting up, by the setting operation on a computer connected to it through a communication network, the functions and associated information for a copy machine and image reader that the apparatus can work based on its image reading function and printing function.

Other objects of the present invention will become apparent from the following detailed description taken in conjunction with the accompanying drawings.

DESCRIPTION OF THE PREFERRED EMBODIMENT

Figure 1:
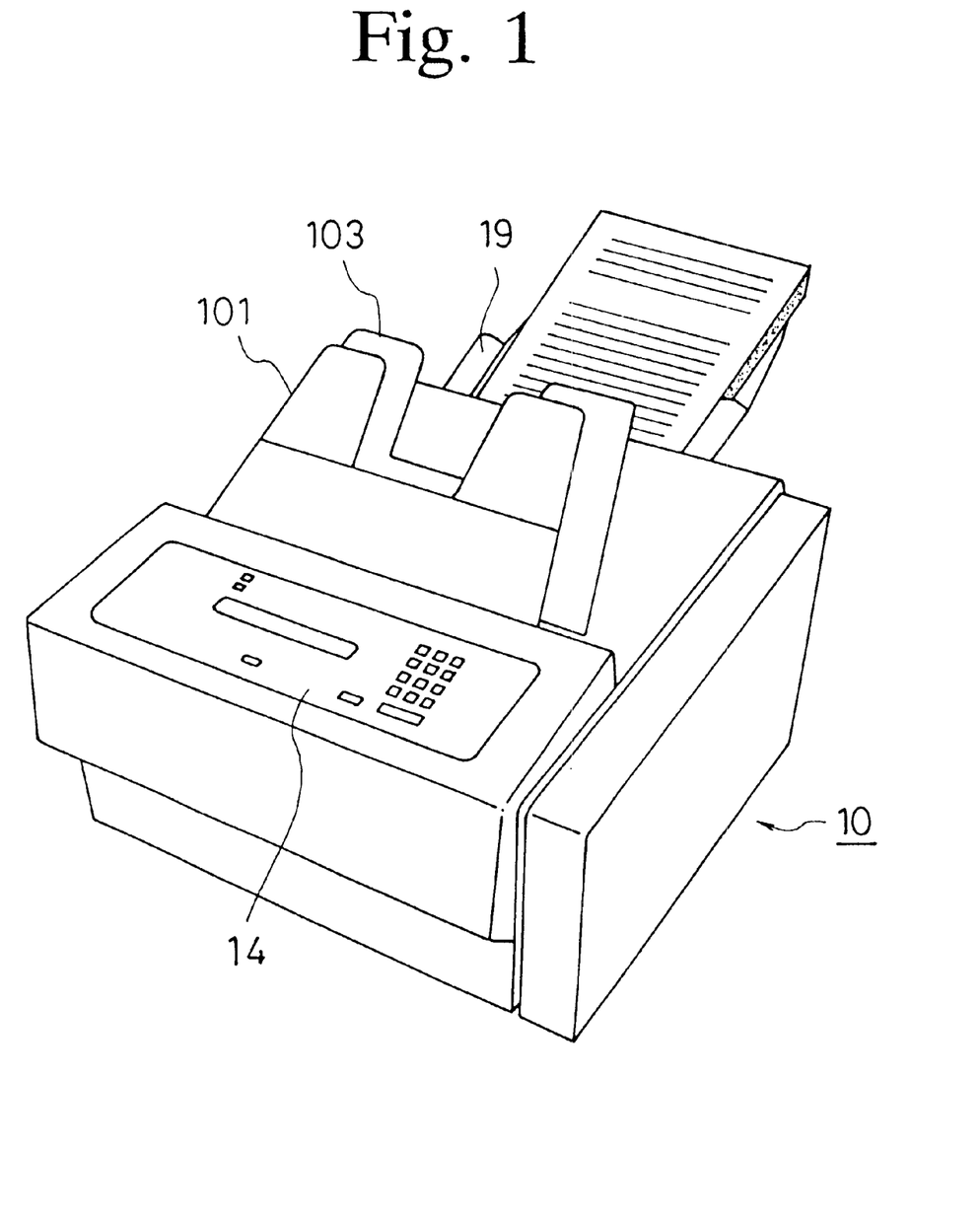
FIG. 1 is a perspective view of a facsimile machine based on this invention.
Figure 2:
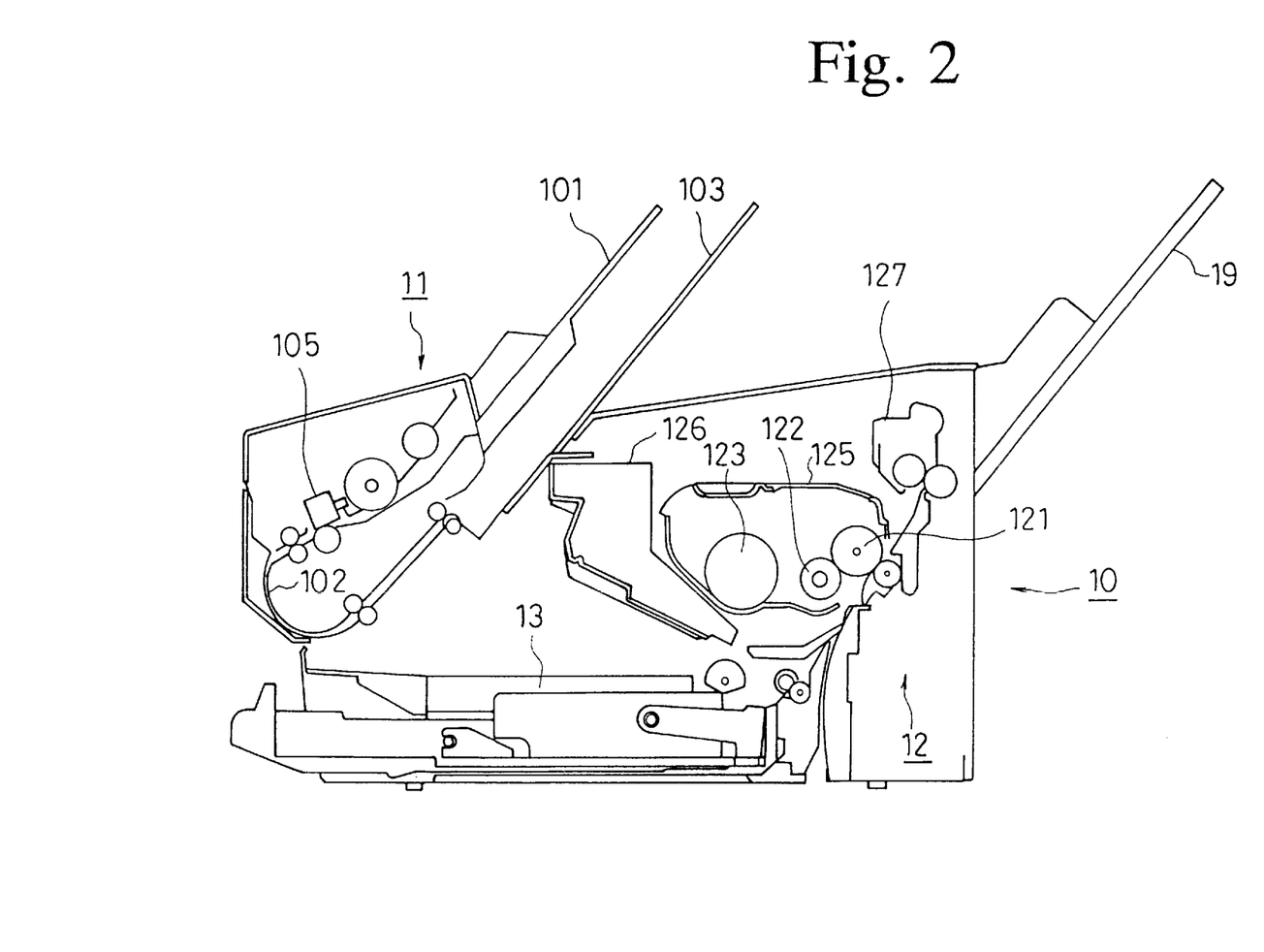
FIG. 2 is a cross-sectional diagram showing the internal structure of the facsimile machine.

The facsimile machine (recording apparatus) based on an embodiment of the present invention will be explained with reference to FIG. 1 and FIG. 2 showing the perspective and internal arrangement. The facsimile machine 10 has an image scanner 11, a printer engine (printer section) 12, a paper cassette 13, and an operation panel 14.

The image scanner 11 includes a document supply tray 101, a document passage 102, a document take-up tray 103, and a CCD sensor 105. A source document transported from the document supply tray 101 into the machine is read by the CCD sensor 105, and thereafter taken out and placed on the document take-up tray 103.

The printer engine 12 which is based on electrophotography system includes an imaging cartridge 125 which incorporates a photosensitive drum 121, developer 122 and toner supply device 123, a laser optical system 126 which forms a latent image of the source document on the photosensitive drum 121, and a fixer 127 which fixes the toner image transferred from the photosensitive drum 121 to recording paper.

A laser beam emitted by the laser oscillator in the laser optical system 126 is modulated by the image signal produced by the CCD sensor 105, and a latent image of the source document is formed by it on the photosensitive drum 121. The latent image on the photosensitive drum 121 is developed by the developer 122 into a toner image, the toner image is transferred onto recording paper, and the image is fixed by the fixer 127. The recording paper, with the image of the source document being printed thereon, is delivered onto the paper delivery tray 19. The facsimile machine 10 explained above is already known.

Figure 3:
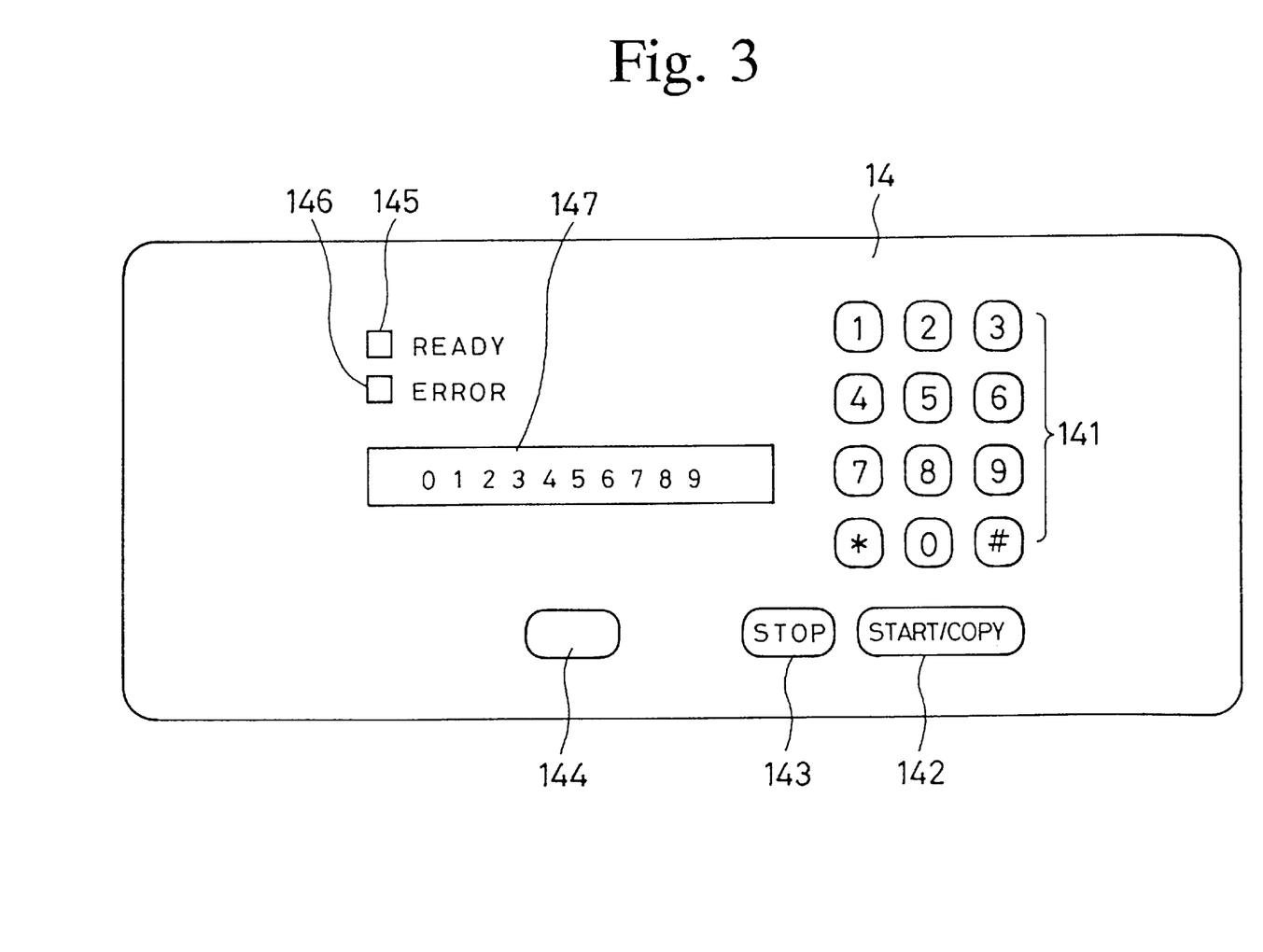
FIG. 3 is a top view of the operation panel of the facsimile machine.

FIG. 3 shows the top view of the operation panel 14, on which are laid out a ten-key set 141 used to key-in numerals 0–9 and symbols * and # for entering a telephone number or operating mode, a start/copy key 142 used to start the transmission or copying of the source document, a stop key 143 used to stop the operation, a function key 144 used to carry out various functions that have been set up by the operation of a personal computer connected to the facsimile machine 10, an LED indicator 145 which indicates the image process ready state, another LED indicator 146 which indicates the occurrence of operation error, and an LCD indicator 147 which displays the user's identification (ID) number or destination facsimile number entered with the ten-key set 141, operational state of the machine, etc.

Figure 4:
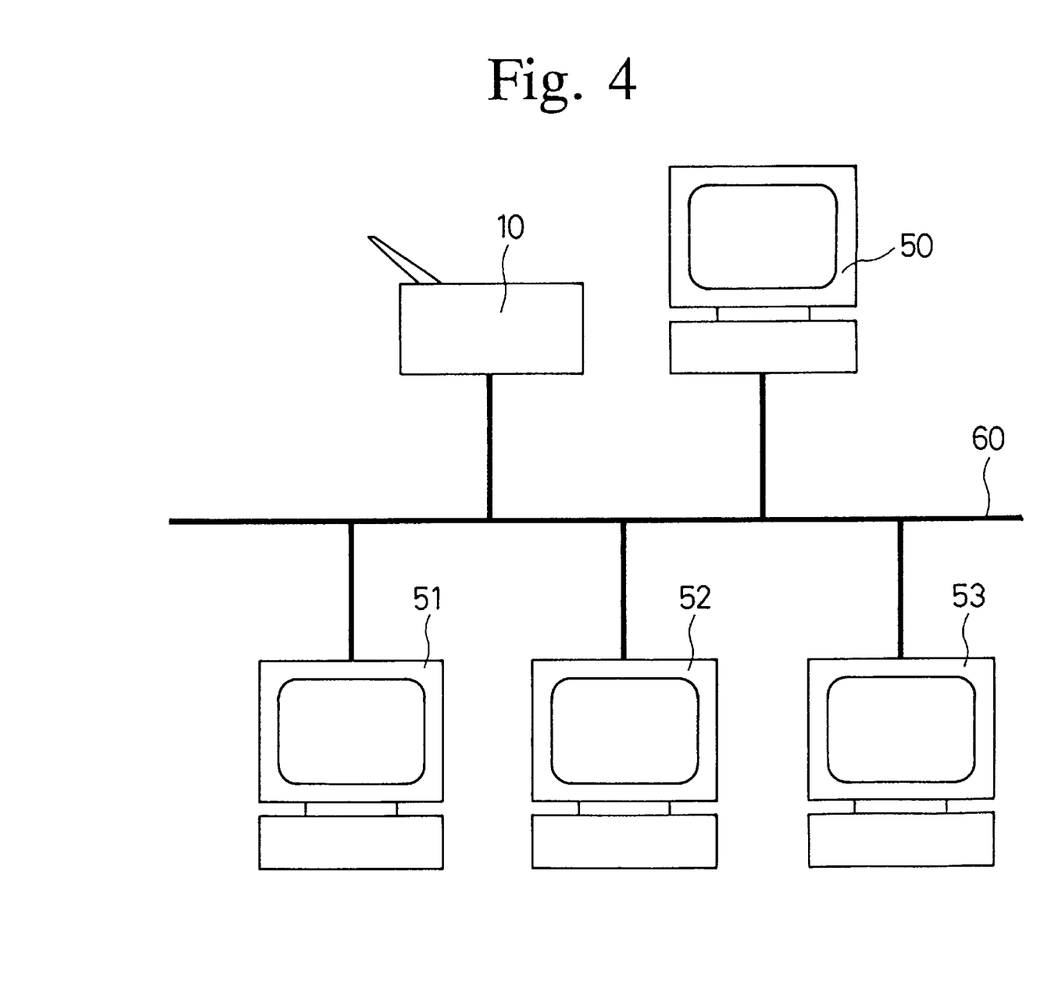
FIG. 4 is a diagram explaining the connection of the facsimile machine to personal computers through a communication network.

FIG. 4 shows the connection of the facsimile machine to personal computers through a communication network. In the example shown, the facsimile machine 10 is connected to four personal computers 50,51,52 and 53 through a communication network 60. The communication network 60 used in this embodiment can be a private communication cable, local area network (LAN) or public communication network.

Figure 5:
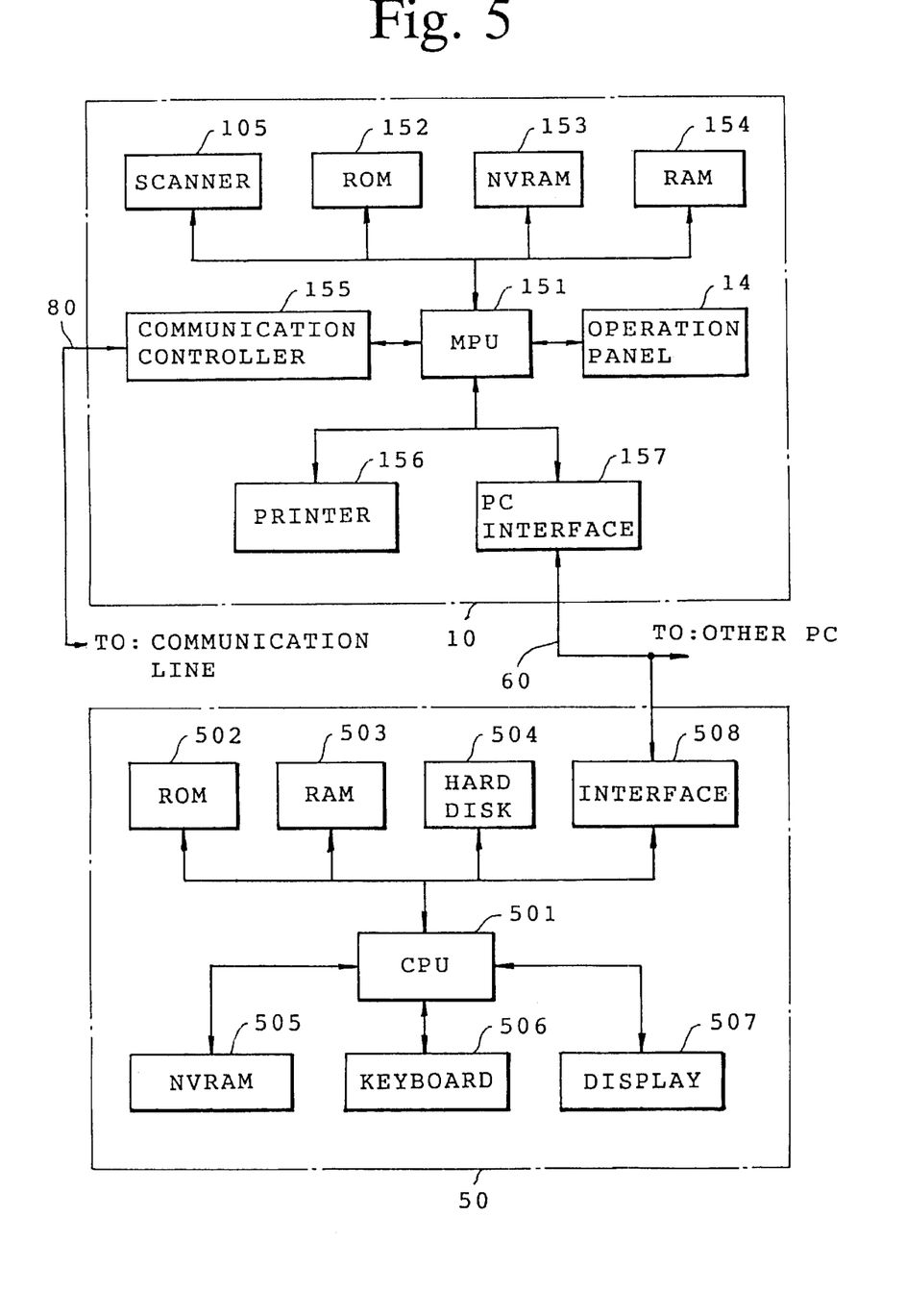
FIG. 5 is a block circuit diagram of the facsimile machine and personal computer.

FIG. 5 shows by block diagram the circuit arrangement of the facsimile machine and personal computer. The facsimile machine 10 has its main controller formed of a microprocessor (MPU) 151, which is connected with a ROM 152 which stores operation programs run by the MPU 151, a NVRAM 153 which stores in formation of registered functions and associated information, a RAM 154 which holds process data temporarily, a communication controller 155, a printer 156, a PC interface 157, and the scanner 105 and operation panel 14 mentioned previously. The communication controller 155 is connected to a public communication network 80.

The image signal of a source document read by the scanner 105 is encoded, compressed and modulated to meet the standard of the public communication network 80 by the communication controller 155 under control of the MPU 151, and the resulting outgoing signal is sent to the specified destination.

An incoming signal received through the public communication network 80 is demodulated and decoded by the communication controller 155, and the resulting image signal is printed by the printer 156.

The personal computer 50 (any of 50 through 53) has its main controller formed of a microprocessor (CPU) 501, which is connected with a ROM 502, RAM 503, hard disk 504, NVRAM 505, keyboard 506, display unit 507, and interface 508.

The personal computer 50 and facsimile machine 10 have their interface 508 and PC interface 157 connected by way of the communication network 60 thereby to transmit the control signals and image data each other.

Figure 6:
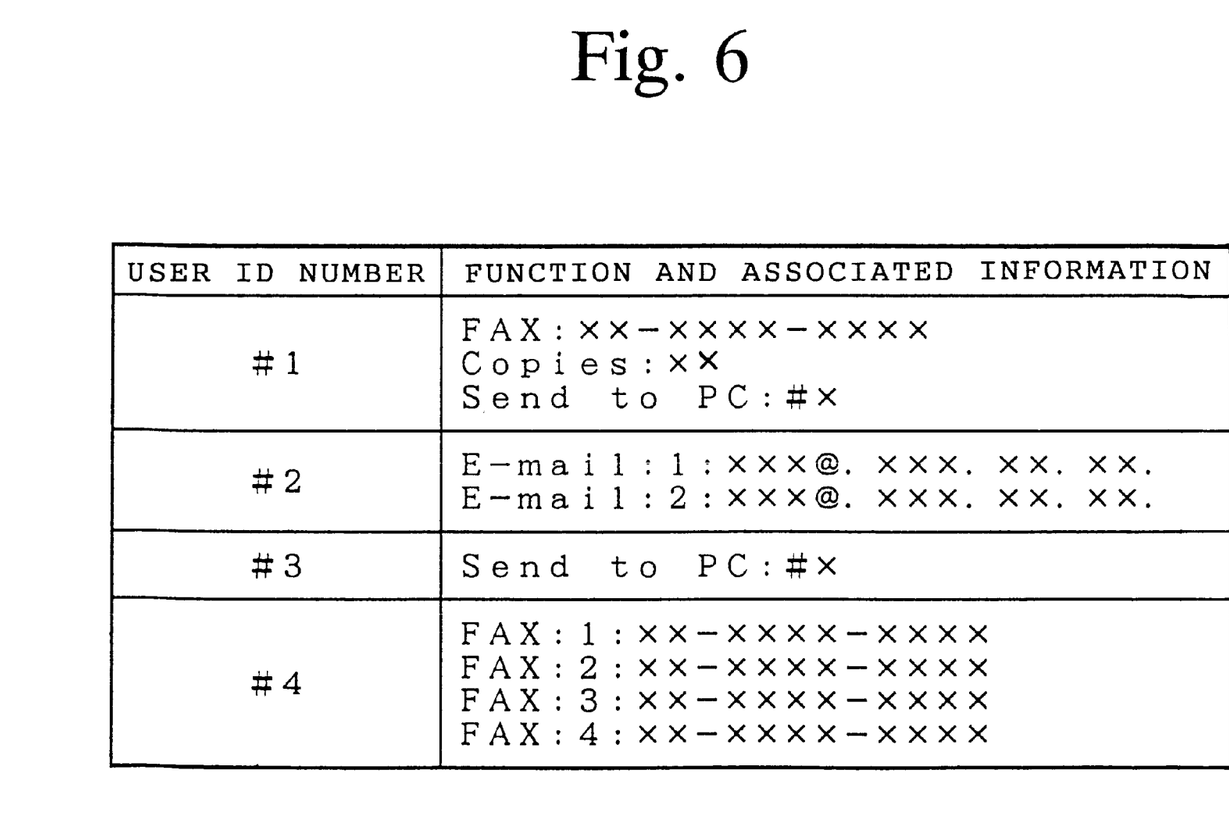
FIG. 6 is a table showing an example of the function table which lists registered functions and associated information.

FIG. 6 shows an example of the function table which lists the functions and associated information registered on the facsimile machine. This table is stored in the NVRAM 505 of the personal computer 50, and it can be read out by using the function key 144 on the operation panel. For the users with ID numbers #1, #2 and #4, in which case multiple functions and associated information are set, these functions are carried out sequentially in the order of list.

The contents of the table and their operations will be explained briefly.

Label "FAX" stands for the facsimile function, by which destination facsimile number specified by "xx-xxxx-xxxx" is dialed automatically and the image of a source document placed on the document supply tray 101 is sent to it. Label "Copies" stands for the copy function, by which the image of a source document placed on the document supply tray 101 is printed on a number specified by "xx" of sheets of recording paper. Label "Send to PC" stands for the document scanning function, by which a source document placed on the document supply tray 101 is read and transferred to the personal computer having the ID number specified by "#x". Label "E-mail" stands for the electronic mail function for sending a message to a specific user over a communication network such as LAN, by which the image of a source document placed on the document supply tray 101 is sent and stored in the E-mail box of the user specified by address "1:xxxx" (or "2:xxxx")of E-mail server computer connected on the communication network.

Next, these functions and their operations will be explained. The operation common to all functions will first be explained.

The user having ID number #n places a source document on the document supply tray 101, enters one's own ID number #n with the ten-key set 141 and confirms it on the LCD indicator 147, pushes the function key 144, and pushes the start key 142. Then, the function(s) registered for the user of the ID number #n is carried out.

Specifically, the user of ID number #1 has the setup of three functions, i.e., (1) FAX function for sending a document image to the destination facsimile number xx-xxxx-xxxx, (2) copy function for making "xx" prints of the document image, and (3) scanning function for sending the document image to the personal computer having ID number #x.

For this user, the FAX function is carried out at first. Specifically, a source document placed on the document supply tray 101 is read, and image data is stored temporarily in the RAM 154. The specified facsimile number xx-xxxx-xxxx is dialed so that the facsimile machine is connected to the destination machine through the communication line, and image data is read out from the RAM 154 and sent to the destination machine. In case the facsimile machine fails in line connection, and if it eventually fails in retrials a certain number of times, it skips this function and proceeds to the operation for the next function.

On completion of transmission of the image data, the facsimile machine proceeds to the operation of the next function (copy function in this example). Specifically, the image data is read out from the RAM 154, and printed on xx sheets of recording paper repeatedly.

Subsequently, the facsimile machine carries out the scanning function. Specifically, the image data is read out from the RAM 154, and sent to the personal computer having ID number #x. The series of operations completes.

In this case, the source document is read only once, and produced image data is used for the FAX function, copy function and scanning function successively.

The user of ID number #2 has the setup of two functions, i.e., E-mail function for sending a document image to the destination E-mail boxes addressed by 1:xxxx and 2:xxxx.

For this user, a source document placed on the document supply tray 101 is read, and image data is stored temporarily in the RAM 154. The image data is read out from the RAM 154, and sent and stored in the E-mail boxes of these addresses sequentially.

The user of ID number #3 has the setup of the scanning function for sending a document image to the personal computer having ID number #x.

For this user, a source document placed on the document supply tray 101 is read, and image data is sent to the personal computer having ID number #x.

The user of ID number #4 has the setup of four functions, i.e., FAX function for sending a document image to the destination facsimile machines having numbers xx-xxxx-xxxx.

For this user, a source document placed on the document supply tray 101 is read, and image data is stored temporarily in the RAM 154. The first facsimile number xx-xxxx-xxxx is dialed so that the facsimile machine is connected to the destination machine through the communication line, and image data is read out from the RAM 154 and sent to the destination machine. Subsequently, the dialing operation and image data read-out and sending operation are repeated for the second, third and fourth facsimile numbers.

As described above, the facsimile machine has records of registered functions to be carried out for individual user ID numbers #n, and it reads out the function(s) in response to the entry of a user ID number #n and carries out the function(s).

Figure 7:
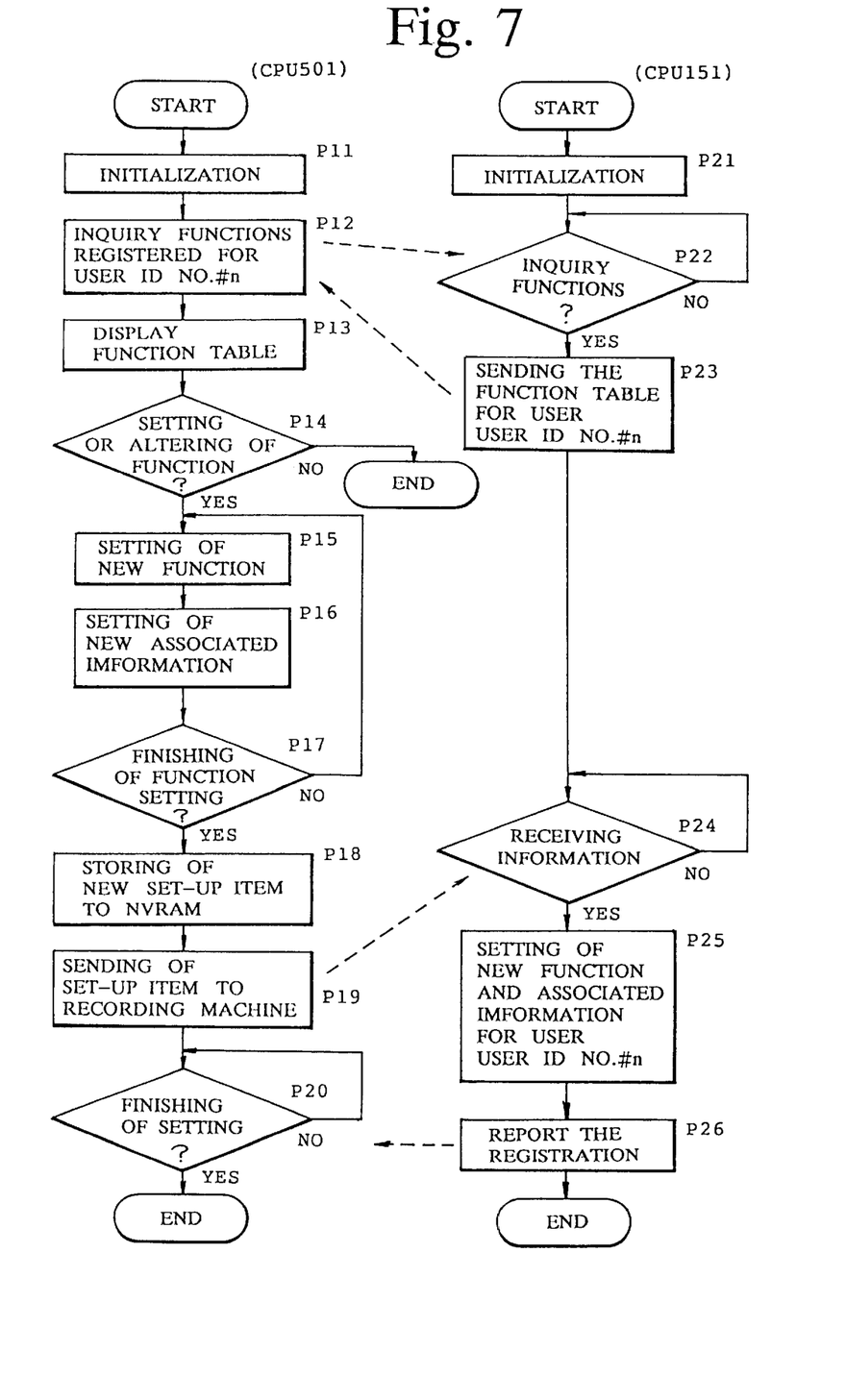
FIG. 7 is a flowchart explaining the function setting/altering processes implemented by the facsimile machine and personal computer.

Next, the process implemented on the part of the personal computer connected to the facsimile machine for setting up or altering functions and associated information of the facsimile machine will be explained in connection with the flowchart of FIG. 7. This process is implemented by the MPU 151 of the facsimile machine 10 and the CPU 501 of the personal computer 50 in accordance with their programs.

As a preliminary process, the CPU 501 of the personal computer 50 reads out from the ROM 502 the program for setting up or altering functions and associated information of individual user ID numbers #n. On the part of the facsimile machine, power is turned on and start up the MPU 151, which reads out the program from the ROM 152 and enters the wait state.

The CPU 501 implements the initialization (step P11), and thereafter inquires of the facsimile machine 10 the functions registered for the user ID number #n: (step P12). The MPU 151 of the facsimile machine 10, which has implemented the initialization (step P21) and entered the wait state (step P22), responds to the inquiry from the personal computer 50 based on the interrupt routine of the program thereby to send the contents of function table for the user ID number #n to the CPU 501: (step P23).

The CPU 501 receives the function table and displays it on the display unit 507:(step P13).

Figure 8:
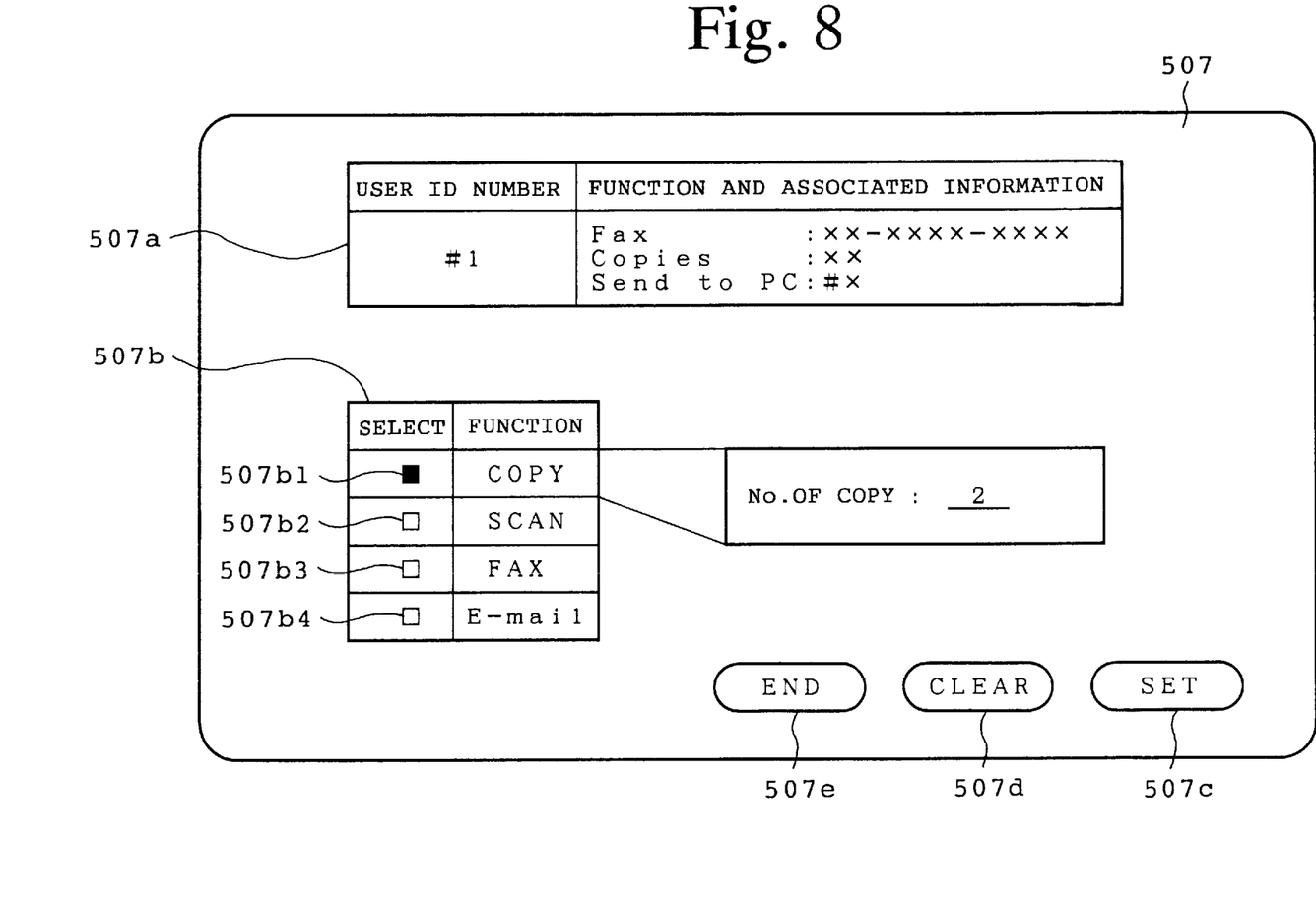
FIG. 8 is a diagram showing an example of picture on the display unit of the personal computer.

FIG. 8 shows an example of display picture on the display unit 507 of the personal computer 50. On the display picture, an area 507a displays a user ID number and registered functions and associated information. In this example, the area 507a displays three items of function, i.e., (1) facsimile function for sending a text image to the destination facsimile machine with number xx-xxxx-xxxx, (2) copy function for making xx prints of the text image, and (3) scanning function for sending the text image to the personal computer with ID number #x.

An area 507b displays associated information of the functions, and an item of function can be selected by clicking a relevant one of marks 507b1–507b4 in the select field with the mouse device. In this example, the copy function is selected (inverted mark 507b1 is indicated), and the setup of making two prints is displayed.

Label "SET" 507c is clicked with the mouse device to settle the functions and associated information displayed, label "CLEAR" 507d is clicked to delete the functions and associated information displayed, and label "END" 507e is clicked to terminate the setting (or alteration) of functions and associated information. These marks and labels may be pointed with the track ball or other pointing device, instead of the mouse device.

The user at the personal computer 50 confirms the displayed functions and associated information, and clicks the "END" label 507e to approve the settings, or operates the keyboard 506 to set or alter a function and/or associated information.

The CPU 501 senses the clicking of the "END" label: (step P14), and terminates the process in response to the detection, or otherwise goes on the process of setting or altering a function and/or associated information entered with the keyboard 506 or mouse device by the user: (steps P15 and P16).

During the function setting/altering process, the CPU 501 senses the clicking of the "END" label: (step P17), and continues the process of steps P15 and P16 unless it is detected. A newly set-up item or altered item is displayed for confirmation. On detecting the clicking of the "END" label in step P17, the CPU 501 stores the set-up or altered function and associated information in the NVRAM 505: (step P18).

The personal computer 50 sends the set-up or altered function and associated information for the user ID number #n to the facsimile machine 10: (step P19).

The MPU 151 of facsimile machine 10, which is in the wait state (step P24), responds to the transmission from the personal computer 50 based on the interrupt routine of the program thereby to receive the function and associated information for the user ID number #n and store the data in the NVRAM 153: (step P25). The MPU 151 acknowledges the end of registration to the personal computer 50: (step P26). On receiving the acknowledgment of the registration of function and associated information from the facsimile machine 10, the personal computer 50 terminates the process: (step P20).

Although the foregoing embodiment is designed to allow multiple users to set up multiple functions based on the combination of the ten-key set 141 and function key 144, an alternative design is to provide the operation panel 14 with individual function keys for multiple users so that each user sets up multiple functions with one's own key.

Another possible operating procedure is to select an intended operating mode by using only the function key 144, with the ten-key set 141 being eliminated.

According to this example, as described above, the recording apparatus has its operating modes set up by the operation of the computers connected to it, while allowing each user to select an intended operating mode on the operation panel of the recording apparatus. Consequently, it becomes possible to set up many operating modes instead of eliminating functions of the recording apparatus, provide a simple and compact operation panel for the recording apparatus, and enables the compact and low-cost design of the recording apparatus.

According to this example, the recording apparatus has its multiple operating modes set up on the part of multiple computers connected to it, allowing each computer to set up a unique operating mode. Accordingly, one recording apparatus can be used by multiple users in different operating modes assigned to the users. The simplified and compact operation panel enables the compact and low-cost design of the recording apparatus.

What is claimed is:

1. An image forming apparatus having multiple operating modes including an image forming mode for forming an image on a recording medium and a transmission mode for transmitting image information to a computer connected to said image forming apparatus through a communication line, said image forming apparatus comprising:
   a receiver which receives operating mode information being associated with a user information sent from one or more computers connected to said image forming apparatus through said communication line;
   a memory device for memorizing the received operating mode information being associated with each user information respectively;
   a manual operating device for selecting a user information from among the user information memorized in the memory; and
   a processor for executing an operation according to the operating mode with which user information is associated and selected by said manual operating device.

2. The image forming apparatus according to claim 1, wherein said operating modes include a facsimile mode in which a source document is read and the image of the source document is sent to an identified destination machine, a copy mode in which the source document is read and the image of the source document is recorded on a specified number of sheets of recording medium, a scanning mode in which the source document is read and the image of the source document is sent to a specified computer, and an electronic mail mode in which the source document is read and the image of the source document is sent and stored in an electronic mail box assigned to a user in one of the computers connected to said image forming apparatus through the communication line.

3. The image forming apparatus according to claim 1, further including a transporter which transports a source document to an image reading section, a feeder for feeding recording medium, a scanner for scanning the source document to produce an image information signal, a transmitter/receiver for sending and receiving image information signals through the communication line, and a printer for printing the image on the recording medium.

4. The image forming apparatus according to claim 1, further comprising a manual operation device for instructing an execution of the operating mode set by said processor and said operating mode is executed by the operation of said manual operating device.

5. The image forming apparatus according to claim 1, further comprising an image reader for reading an image of a source document and outputting an image data signals, and said processor executes the operation of forming the image of the source document on a recording medium based on the image read by said image reader when the image forming mode is selected, and transmitting the image data signals to external devices when the transmitting mode is selected.

6. An information processing system including an image forming apparatus and at least one computer connected to said image forming apparatus through a first communication line;
   said image forming apparatus configured for operating in multiple operating modes including an image forming mode for forming an image onto a recording medium and a transmission mode for transmitting image information through a second communication line;
   said at least one computer configured for setting operating mode information being associated with a user information, which controls the operating mode of said image forming apparatus, and said operating mode information being transmitted to and memorized by said image forming apparatus through said first communication line and, the operating mode of said image forming apparatus is set up by said transmitted information; and
   said image forming apparatus comprising a manual operating device for selecting a user information from among the user information memorized in the memory, and a processor for executing an operation according to the operating mode with which user information is associated and selected by said manual operating device.

7. The information processing system according to claim 6, wherein said operating mode information includes an information identifying each of a plurality of computers and an information specifying each operating mode.

8. The information processing system according to claim 7, wherein said operating mode information further includes an associated information for specifying the function of each operating mode, and said function specifying information being registered in correspondence to each computer identification information.

9. The information processing system according to claim 7, wherein said function specifying information specifies a facsimile mode in which a source document is read and the image of the source document is sent to the identified destination machine, a copy mode in which the source document is read and the image of the source document is printed on a specified number of sheets of recording medium, a scanning mode in which the source document is read and the image of the source document is sent to a specified computer, and an electronic mail mode in which the source document is read and the image of the source document is sent and stored in an electronic mail box assigned to a user through the communication line.

10. The information processing system according to claim 6, wherein said operating mode of said image forming apparatus being set up based on the operating mode information transmitted through said first communication line by the operation of a function key on an operation panel of said image forming apparatus.

11. The information processing system according to claim 6, said image forming apparatus further comprising an image reader for reading an image of a source document and outputting image data signals and said processor executes the operation of forming the image of the source document on a recording medium based on the image read by said image reader when the image forming mode is selected, and transmitting the image data signals to external devices when the transmitting mode is selected.

12. An image forming apparatus having multiple operating modes including an image forming mode for forming image onto a recording medium and a transmitting mode for transmitting image information through a communication line, said image forming apparatus comprising:
   a receiver for receiving and memorizing operating mode information being associated with a user information sent from a computer connected to said image forming apparatus through the communication line;
   a setting device for setting an operating mode of said image forming apparatus based on the operating mode information being associated with each user information received and memorized by said receiver;
   a manual operating device for selecting a user information from among the user information memorized in the memory; and a processor for executing an operation according to the operating mode with which user information is associated and selected by said manual operating device.

13. The image forming apparatus according to claim 12, further comprising an instruction device for instructing an execution of the operating mode set, and the operating mode set on said apparatus is executed by the operation of said instruction device.

14. The image forming apparatus according to claim 12, further comprising a memory device for storing a plurality of operating mode information received through the communication line.

15. The image forming apparatus according to claim 14, further comprising a manual operation device for instructing an execution of a specified instruction, and the operating mode being set by reading out the operating mode information from said memory device by the operation of said manual operation device.

16. The image forming apparatus according to claim 12, further comprising an image reader for reading an image of a source document and outputting image data signals, and said processor executes the operation of forming the image of the source document on a recording medium based on the image read by said image reader when the image forming mode is selected, and transmitting the image data signals to external devices when the transmitting mode is selected.

* * * * *